(12) United States Patent
Rouillon et al.

(10) Patent No.: US 9,664,167 B2
(45) Date of Patent: May 30, 2017

(54) VALVE ARRANGEMENT

(71) Applicant: DELPHI INTERNATIONAL OPERATIONS LUXEMBOURG S.A.R.L., Bascharage (LU)

(72) Inventors: Raphael Rouillon, Onzain (FR); Etienne Pereira, Cande-sur-Beuvron (FR); Guillaume Trenado, Les Montils (FR); Jean-Luc Rouet, Chitenay (FR)

(73) Assignee: Delphi International Operations Luxembourg S.A.R.L., Luxembourg (LU)

( * ) Notice: Subject to any disclaimer, the term of this patent is extended or adjusted under 35 U.S.C. 154(b) by 27 days.

(21) Appl. No.: 14/435,508

(22) PCT Filed: Jul. 30, 2013

(86) PCT No.: PCT/EP2013/065952
§ 371 (c)(1),
(2) Date: Apr. 14, 2015

(87) PCT Pub. No.: WO2014/067678
PCT Pub. Date: May 8, 2014

(65) Prior Publication Data
US 2015/0260139 A1 Sep. 17, 2015

(30) Foreign Application Priority Data

Oct. 30, 2012 (EP) ..................... 12190628

(51) Int. Cl.
*F16K 17/20* (2006.01)
*F02M 63/02* (2006.01)
(Continued)

(52) U.S. Cl.
CPC ........ *F02M 63/025* (2013.01); *F02D 41/3863* (2013.01); *F02M 37/0029* (2013.01);
(Continued)

(58) Field of Classification Search
CPC .. F16K 27/0245; F16K 15/044; F16K 17/048; F16K 17/0406; F02M 37/0029; F02M 63/005; F02M 63/0025; F02D 41/3863; Y10T 137/7848
(Continued)

(56) References Cited

U.S. PATENT DOCUMENTS 5,295,469 A 3/1994 Kariya et al.
6,283,094 B1 * 9/2001 Ogata .................. F02M 59/462
123/467

(Continued)

OTHER PUBLICATIONS

International Search Report dated Sep. 6, 2013.

*Primary Examiner* — Umashankar Venkatesan
(74) *Attorney, Agent, or Firm* — Joshua M. Haines

(57) ABSTRACT

A valve arrangement comprising: a valve outlet for communication with a low pressure drain; a valve housing provided with a bore for receiving fuel from an accumulator volume; and a valve member having a closed position in which it engages a valve seating defined by the bore to prevent fuel flow from the accumulator volume to the valve outlet. The valve arrangement further comprises a first restricted flow means for restricting the flow of fuel between the accumulator volume and the valve outlet during a first stage of valve opening movement; a second restricted flow means effective during a second stage of valve opening movement to provide a greater restriction than during the first stage; and a third restricted flow means effective during a third stage of valve opening movement to provide a variable restriction to fuel flow dependent on the extent of opening movement of the valve member.

6 Claims, 4 Drawing Sheets

(51) Int. Cl.
    *F02M 63/00*     (2006.01)
    *F02M 37/00*     (2006.01)
    *F16K 15/04*     (2006.01)
    *F16K 17/04*     (2006.01)
    *F16K 27/02*     (2006.01)
    *F02D 41/38*     (2006.01)

(52) U.S. Cl.
    CPC ...... *F02M 63/005* (2013.01); *F02M 63/0056* (2013.01); *F16K 15/044* (2013.01); *F16K 17/0406* (2013.01); *F16K 17/048* (2013.01); *F16K 27/0245* (2013.01); *Y10T 137/7848* (2015.04)

(58) Field of Classification Search
    USPC .................... 137/469, 540, 536; 251/337
    See application file for complete search history.

(56) References Cited

U.S. PATENT DOCUMENTS

| | | |
|---|---|---|
| 6,446,613 B1 | 9/2002 | Djordjevic |
| 2005/0205065 A1 | 9/2005 | Rembold et al. |
| 2008/0047621 A1 | 2/2008 | Ittlinger et al. |

\* cited by examiner

VALVE ARRANGEMENT

CROSS REFERENCE TO RELATED APPLICATIONS

This application is a national stage application under 35 U.S.C. 371 of PCT Application No. PCT/EP2013/065952 having an international filing date of 30 Jul. 2013, which designated the United States, which PCT application claimed the benefit of European Patent Application No. 12190628.3 filed on 30 Oct. 2012, the entire disclosure of each of which are hereby incorporated herein by reference.

FIELD OF THE INVENTION

The invention relates to a valve arrangement for use in a fuel system for an internal combustion engine. In particular, but not exclusively, the invention relates to a valve arrangement for use in limiting the pressure of fuel in an accumulator volume (common rail) of a common rail fuel system.

BACKGROUND TO THE INVENTION

In common rail fuel systems for diesel engines, a high pressure fuel pump receives fuel at relatively low pressure (e.g. transfer pressure) from a low pressure pump and pressurises fuel to a high level suitable for injection. The high pressure fuel pump supplies pressurised fuel to a fuel accumulator volume, referred to as the common rail, from where the pressurised fuel is delivered to the downstream fuel injectors of the system.

It is usual to provide the common rail with a pressure limiter valve, or safety valve, which is operable to open in the event that fuel pressure within the common rail exceeds a predetermined safe level (referred to as the threshold pressure level). The pressure limiter valve comes into effect should a failure occur in the common rail fuel system and provides a means by which over-pressurised fuel can escape to low pressure to avoid the risk of rupture and failure of pump parts, or any other component in the common rail fuel system, including, for example, the common rail, high pressure pipes, pressure sensors or injectors.

One known pressure limiter valve arrangement for performing the aforementioned function is shown in FIG. 1. The valve arrangement includes a first valve housing 10 defining an inlet channel 12 and a second valve housing 14 defining an outlet channel 16. The inlet channel 12 communicates with fuel at high pressure within the common rail (not shown) and the outlet channel 16 communicates with a low pressure fuel drain (not shown). A valve member 18 in the form a ball valve is engageable with a valve seating 20 to control communication between the common rail and the low pressure drain. The valve seating 20 is spherical in form and defines a valve seating area which accommodates the seated ball 18. A spring 22 acts on the ball valve 18 through an abutment member 24 which is slidably received in a bore 26 defined by the second valve housing 14, and serves to urge the ball valve 18 against the valve seating 20. The spring 22 acts against fuel pressure within the inlet channel 12 and, hence, against fuel pressure within the common rail.

When in the seated position (i.e. ball valve closed), fuel within the common rail is unable to flow to the low pressure drain past the valve seating 20. For a correctly functioning pump, the ball valve 18 remains seated throughout pump life and the threshold pressure level is never exceeded in the rail. However, in the event of a failure in the common rail fuel system causing an increase in fuel pressure within the common rail above the threshold pressure level, the force acting on the ball valve 18 in an opening direction (i.e. against the spring force) is sufficient to lift the ball valve 18 from the valve seating 20. In such circumstances fuel within the common rail is able to flow to the low pressure drain through the outlet passage 16, thus relieving high fuel pressure within the rail. The threshold pressure level at which the valve opens is determined by the ratio of the spring force to the area of the seating 20. Another pressure limiter is known from US2008/0047621.

If the threshold pressure is exceeded, causing the ball valve 18 to lift, a restriction is created between the ball valve 18 and the valve seating 20. The pressure required to keep the ball valve open is equal to the spring force divided by the new surface area over which the pressure acts. This new surface area is a combination of the exposed surfaces of the ball valve 18, and the abutment member 24, which can be approximated as the cross sectional area of the bore 26. As this area is much larger than the valve seating area, the pressure required to keep the ball valve open, or the regulation pressure, is lower than the pressure required to open it initially. However, due to the restriction between the ball valve 18 and the valve seating 20, the pressure that is exerted over the surfaces of the ball valve 18 and abutment member 24 is considerably lower than the fuel pressure within the common rail. Therefore, the regulation pressure for the valve arrangement in FIG. 1 is not much lower than the opening pressure. This effect is illustrated in FIG. 2.

The effect of this is that the fuel flows through the valve arrangement at relatively high pressure, and therefore at a high flow rate. This means that if the ball valve is open for more than a few minutes, damage could occur to the common rail system or to the ball valve itself. Damage may be caused through one of a number of mechanisms: (1) the high pressure and flow rate lead to a very high temperature around the ball valve; (2) a combination of high pressure and high flow rate cause direct erosion of the ball valve and piston; and (3) the high pressure may cause damage by fatigue, creating cracks in the components.

It is desirable in modern diesel engines for common rail systems to offer a "limp home" mode, in which the system is able to comfortably operate for significant periods in the event of a pump failure causing high pressure in the system. Valve arrangements such as that shown in FIG. 1 are not suitable for this requirement, as they can only operate effectively for short periods.

By way of background to the invention, U.S. Pat. No. 5,295,469 to Nippondenso Co., Ltd. discloses a pressure limiter valve which offers a limp home mode. However, the arrangement described in this patent suffers from the drawback that a piston member must be formed with grooves in order to create the limp home effect. The grooves in the piston member also need to communicate with an annular groove in the valve housing and, therefore, the tolerances involved in manufacturing the components of the valve will be relatively tight. As a consequence, the valve arrangement is difficult, and expensive, to manufacture.

It is one object of the present invention to provide an improved valve arrangement, for use in a high pressure fuel system, which overcomes or alleviates the aforementioned disadvantages known in the prior art.

SUMMARY OF THE INVENTION

According to a first aspect of the invention, there is provided a valve arrangement for use in limiting the pressure of fuel within an accumulator volume of an accumulator fuel system to a predetermined threshold level, the valve arrangement comprising: a valve outlet for communication with a low pressure drain; a valve housing provided with a valve housing bore for receiving fuel from the accumulator volume; and a valve member having a closed position in which it is engaged with a valve seating defined by the valve housing bore to prevent fuel flow from the accumulator volume to the valve outlet. The valve arrangement further comprises biasing means for urging the valve member towards the valve seating. A first restricted flow means restricts the flow of fuel between the accumulator volume and the valve outlet during a first stage of valve opening movement as soon as the valve member is lifted from the valve seating. A second restricted flow means is effective during a second stage of valve opening movement, which follows the first stage, to provide a greater restriction than during the first stage. A third restricted flow means is effective during a third stage of valve opening movement, which follows the second stage, to provide a variable restriction to fuel flow dependent on the extent of opening movement of the valve member, wherein each of the first, second and third restricted flow means is defined between the valve member and the valve housing bore.

For example, the third stage immediately follows the second stage, and the second stage immediately follows the first stage.

In one particular embodiment, the valve arrangement has application in a common rail fuel system for use in limiting the pressure of fuel within a common rail of the fuel system.

The invention provides the benefit that, by virtue of the variable restriction of the third restricted flow means, the pressure of fuel in the common rail can be regulated at a pressure that is substantially lower than the opening pressure of the valve arrangement. This allows the fuel system to continue operating for extended periods in the event of a fault that leads to high fuel pressure, by lowering and regulating the pressure at a safer working level, therefore reducing the risk of damage to components of the fuel system. Furthermore, as the first, second and third restricted flow means are all defined by the valve member and the valve housing bore, the invention provides a valve arrangement which is simpler and therefore easier to manufacture.

The third restricted flow means may provide a lower restriction than either the first restricted flow means or the second restricted flow means, so that fuel is drained more effectively during the third stage of valve opening movement, to reduce pressure in the common rail more quickly.

The first stage of valve opening movement is preferably initiated when the pressure of the fuel within the accumulator volume reaches the pre-determined threshold level. This enables the use of the valve arrangement in a pressure relief application, in which the valve arrangement is used to prevent the pressure of the accumulator volume from going beyond the pre-determined threshold level.

The variable restriction provided by the third restricted flow means is preferably arranged to regulate the pressure of the fuel in the accumulator volume at a level which is lower than the pre-determined threshold level. In a common rail fuel system application, this provides the benefit that the common rail fuel system may continue operating for extended periods in the event of a fault that leads to excessively high fuel pressure, without risk of damage to components of the common rail fuel system.

The valve seating may be located on a first conical section which is defined by the valve housing bore. A conical section is an effective way of ensuring that the valve member makes a good contact with the valve seating so as to seal effectively.

The first restricted flow means may be defined between the valve member and the valve seating. This means that the first restriction is created immediately the valve member opens.

The third restricted flow means may be defined by a second conical section, which is defined by the valve housing bore. Due to the shape of the conical section, the third restricted flow means offers a variable level of restriction to fuel flow.

The valve arrangement may be arranged such that the first and second conical sections define an intermediate section therebetween, wherein the intermediate section cooperates with the valve member to define the second restricted flow means.

The intermediate section may be arranged to have a taper, such that the level of restriction is increased as the valve member moves from the first conical section towards the second conical section. This feature aids in transitioning the valve member between the first restricted flow means and the third restricted flow means.

The valve arrangement may further comprise a piston member, which is situated between the biasing means and the valve member. This arrangement allows for ease of manufacture.

In another embodiment, the valve member and the piston member may be formed together as an integrated component, which helps to establish a stable flow of fuel past the valve member.

The valve arrangement may further comprise means to limit the range of movement of the piston member. This feature provides the benefits that the valve member is prevented from overshooting after the second stage of valve opening movement, and also prevents the third restricted flow means from becoming so wide that it provides an unacceptably low level of restriction to fuel flow.

The piston member may be provided with an extension which cooperates with the valve member to aid positioning and/or retention of the valve member.

In another embodiment, an end face of the extension is concave to aid positioning and/or retention of the valve member.

According to a second aspect of the invention, there is provided a high pressure common rail fuel system including a valve arrangement in accordance with the first aspect of the invention, for regulating the pressure of fuel in a common rail of the fuel system.

It will be appreciated that preferred and/or optional features of the first aspect of the invention may be incorporated alone or in appropriate combination in the second aspect of the invention also.

BRIEF DESCRIPTION OF THE DRAWINGS

In order that the invention may be more readily understood, preferred non-limiting embodiments thereof will now be described with reference to the accompanying drawings, in which.

DETAILED DESCRIPTION OF EMBODIMENTS OF THE INVENTION

Figure 1:
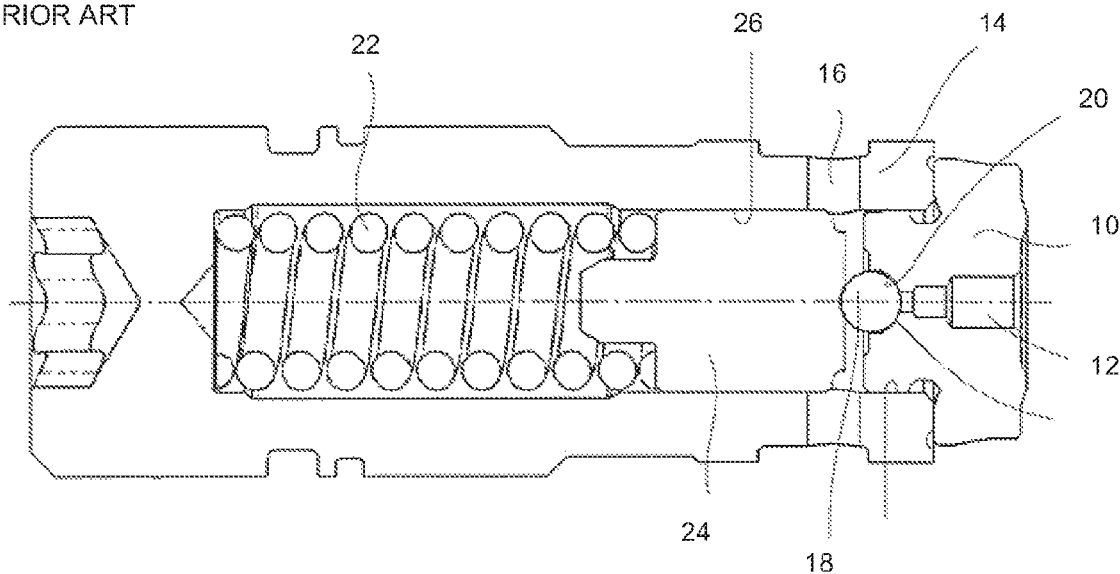
FIG. 1 shows a known pressure limiter valve arrangement.
Figure 2:
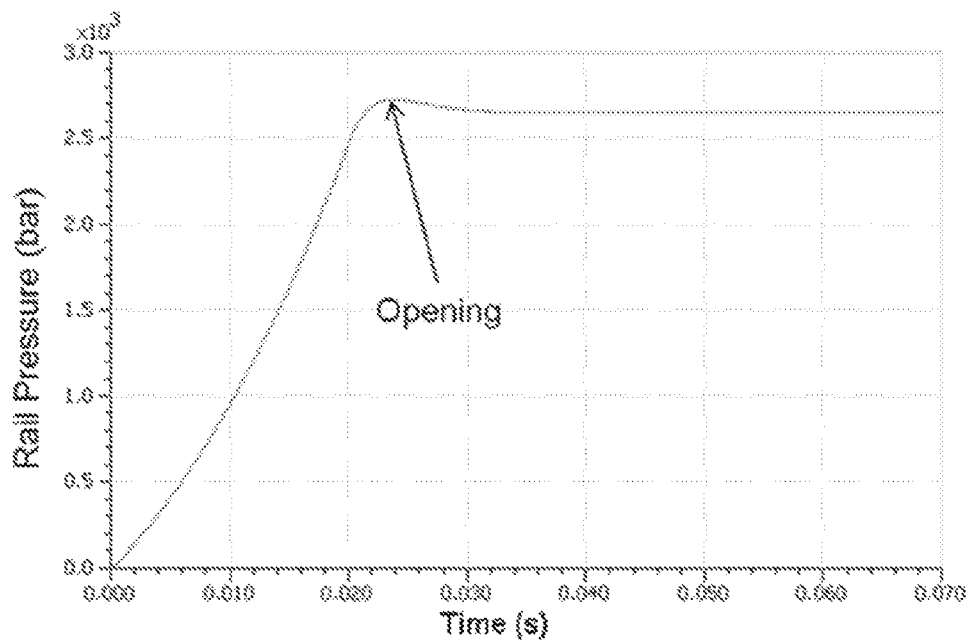
FIG. 2 is a graph showing the performance characteristics of the pressure limiter valve arrangement in FIG. 1.
Figure 3:
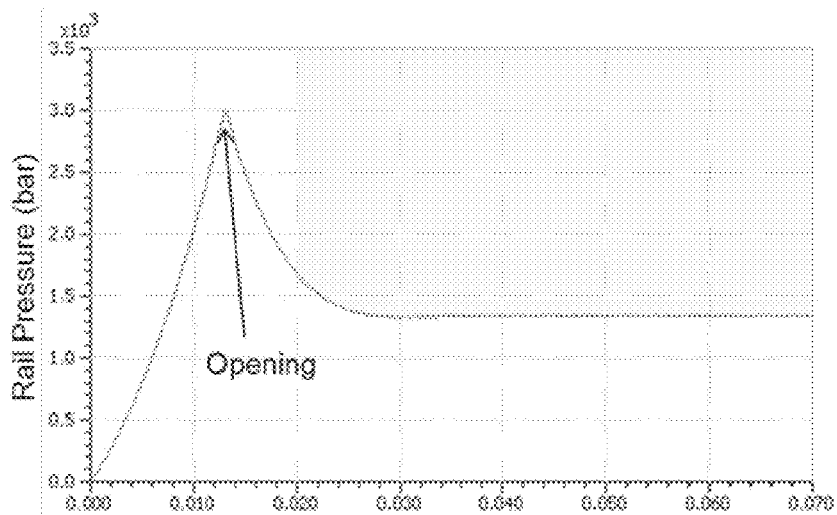
FIG. 3 is a graph showing the performance characteristics of the valve arrangement of the invention.

One object of the invention is to provide a valve arrangement in which a valve member is operable to regulate fuel pressure in an accumulator volume or common rail of a common rail fuel system of an internal combustion engine. The valve arrangement is configured so as to regulate fuel pressure within the common rail at a level which is substantially lower than a pre-determined threshold level at which the valve member opens. FIG. 3 illustrates the performance characteristics of a valve arrangement of the invention, in which the fuel pressure in the accumulator volume rises initially, until it reaches a level at which the valve member opens. Once the valve member opens, the pressure in the common rail is quickly reduced as excess fuel is drained past the valve member. The pressure then settles at a level which in this example is approximately half that at which the valve member initially opened, and the pressure is then regulated at this level. If the pressure in the accumulator were to drop further (not shown), the valve member would close, and the process would start again.

This arrangement provides a clear benefit of the invention in that the regulating pressure is at a level which is considerably lower than the pre-determined threshold level at which the valve member opens, and is therefore at a level at which the valve arrangement and common rail can continue to operate without any danger of damage to any components.

Figure 4:
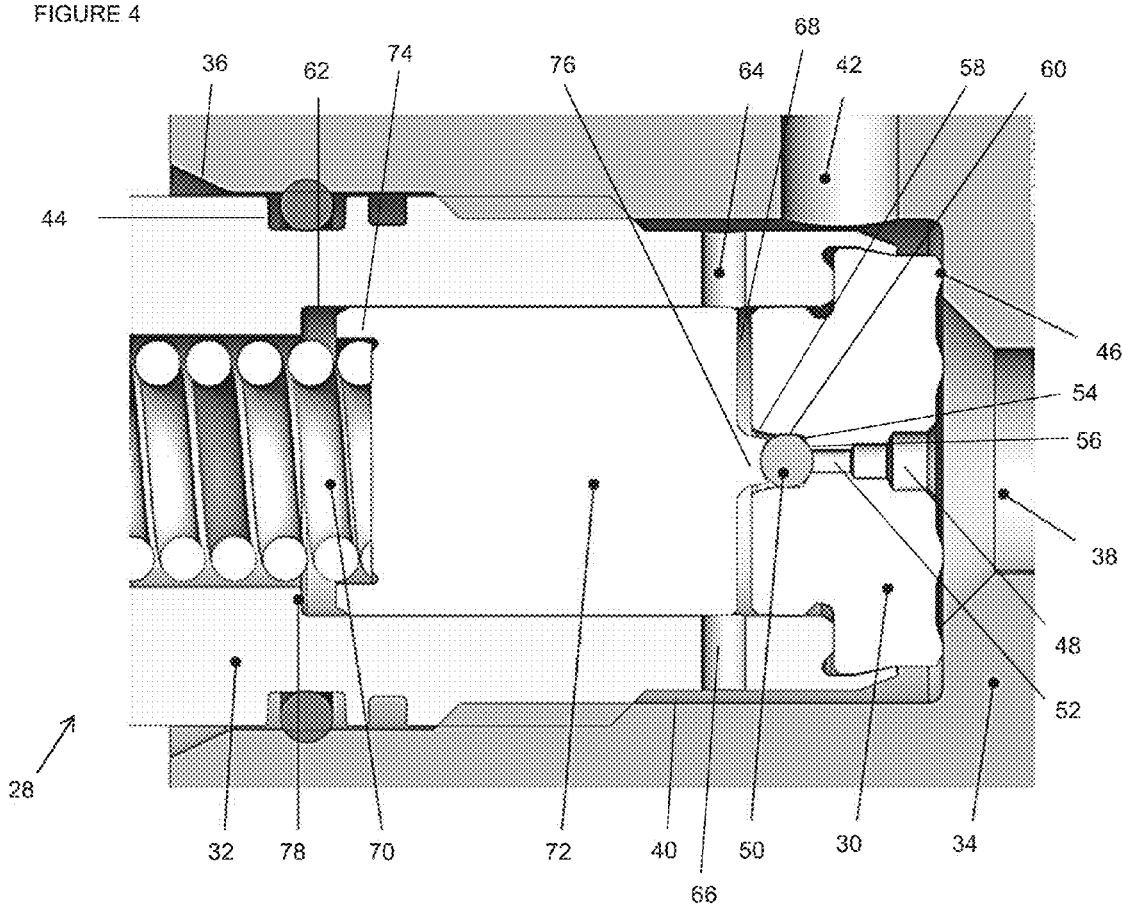
FIG. 4 is a cross-sectional view of a first embodiment of the invention.

FIG. 4 shows a first embodiment of the valve arrangement 28 of the invention, in which the valve arrangement has a first valve housing 30 and a second valve housing 32, both of which are received in a main valve housing 34. The main valve housing 34 is provided with a main valve housing bore 36 within which the first and second valve housings 12, 14 are received. An opening is provided at one end of the main valve housing bore 36 to define a supply passage 38 from the common rail to provide communication between the common rail and the main valve housing bore 36. The first valve housing 30 and a portion of the second valve housing 32 which is adjacent to the first valve housing 30 both have a diameter which is smaller than the diameter of the main valve housing bore 36, and so there is a space between the first and second valve housings 12, 14 and a surface of the main valve housing bore 36, which defines an annular chamber 40. The main valve housing 34 is further provided with a second bore which extends laterally from the main valve housing bore 36, and which defines a flow passage 42 to a low pressure drain (not shown). The flow passage 42 is in communication with the annular chamber 40. The second valve housing 32 is in screw threaded connection with the main valve housing 34, and is provided with an external groove 44 for receiving an O-ring which creates a seal to prevent leakage between the second valve housing 32 and the main valve housing 34.

A valve member 50 in the form of a ball is housed within the first valve housing 30 and is engageable with a valve seating 56 to control fuel flow between the common rail and the flow passage 42.

The first valve housing 30 is arranged to abut an internal face of the main valve housing bore 36, to create a seal 46 to prevent communication between the common rail and the low pressure drain, such that the only path between the two is past the ball 50 when it is unseated.

The first valve housing 30 is provided with a first valve housing bore 48 of circular cross-section, which extends through the entire first valve housing 30 to communicate with the supply passage 38 at one end, and to receive the ball 50 at the other end. The first valve housing bore 48 is divided into four sections of varying diameter: a first section within which the ball 50 is slidably received; a second section which has a smaller diameter than the first section, and which defines a valve inlet 52 which throttles high pressure fuel as it flows towards the ball 50 from the common rail; a third section which has a larger diameter than the valve inlet 52; and a fourth section which has a larger diameter than the third section, such that the third and fourth sections cooperate to funnel fuel towards the valve inlet 52. The first section of the first valve housing bore 48 has two ends, one defining an opening for receiving the ball 50, and the other end defining an interface between the first section and the valve inlet 52. The interface end is chamfered to create a frusto-conical section which defines a first conical section 54 with which the ball 50 engages to define the valve seating 56. When the ball 50 is engaged with the valve seating 56 it is said to be in a closed position. The opening of the first section has an edge which is chamfered or filleted to a radius, to create another frusto-conical section defining a second conical section 58. An intermediate section 60 is defined between the first and second conical sections 54, 58, which in this embodiment is tapered such that the diameter of the intermediate section 60 reduces towards the second conical section 58.

The second valve housing 32 is provided with a bore 62 of circular cross section. The first valve housing 30 is received within the second valve housing bore 62, such that the first valve housing bore 48 and the second valve housing bore 62 are in substantially concentric alignment. The second valve housing 32 further includes a pair of valve outlet ports 64, 66 which are arranged opposite each other and extend laterally away from the second valve housing bore 62, for communication with the annular chamber 40 and therefore with the flow passage 42 to the low pressure drain. When the ball 50 is in the closed position, fuel is prevented from flowing from the common rail to the low pressure drain.

The second valve housing bore 62 and the first valve housing 30 together define a chamber 68 for receiving a spring 70, one end of the spring 70 being in abutment with the closed end of the chamber 68 and the other end of the spring 70 being in abutment with a piston 72 which is slidably received within the chamber 68. The spring 70 provides a biasing force for urging the ball 50 towards the valve seating 56. The piston 72 is provided between the spring 70 and the ball 50, the piston 72 having a contact surface which is provided with a recess 74 for receiving the spring 70 at one end, and an extension 76 extending from the other end, the extension 76 being arranged with a concave surface at its end in which the ball 50 sits. Therefore the biasing force is transmitted from the spring 70, through the piston 72, to the ball 50.

The second valve housing bore 62 is provided with a step which divides the second valve housing bore 62 into two portions of different diameters. The piston 72 is received in the portion with a larger diameter and has a diameter that matches this section such that movement of the piston 72 is guided within the bore 62. Therefore, the diameter of the piston 72 is larger than the other portion of the second valve housing bore 62, such that the step acts as a mechanical stop 78 which limits the range of movement of the piston 72, therefore defining a maximum stroke of the piston 72.

The previously described effect of ensuring a regulating pressure which is lower than a pre-determined threshold level at which the ball 50 lifts from the valve seating 56, thereby providing a "limp home mode", is achieved through the implementation of a three-stage opening process including first, second and third stages of valve opening movement. Each stage of valve opening movement has a respective restricted flow means which may be referred to as the first, second and third flow restrictions, as illustrated in FIGS. 5 to 8.

The first flow restriction is created when the ball 50 initially opens in the first stage of valve opening movement, i.e. immediately as the ball 50 moves off its seating. During the first stage of valve opening movement, the first flow restriction becomes gradually less restrictive as the valve opens further, until a point is reached when the second flow restriction is more restrictive than the first flow restriction; this is the point at which the second stage of valve opening movement commences. The second flow restriction does not alter substantially as the valve opens further, and therefore the second flow restriction acts as a transition stage to move the valve quickly from the first stage of valve opening movement to the third stage of valve opening movement. Once the valve reaches the third stage of valve opening movement, the third flow restriction is created. The third flow restriction provides a variable level of restriction, which may be substantially less restrictive than either the first or second flow restrictions. This allows for a relatively high fuel flow rate through the third flow restriction, which means that excess fuel is drained quickly, thus reducing the fuel pressure more effectively. The third flow restriction is arranged to be in a position which allows for the high pressure fuel to come into contact with a much larger surface area of the ball 50 than when the ball 50 is seated, therefore the ball 50 remains open at a pressure which is substantially lower than the pre-determined threshold level at which the ball 50 opens initially.

Figure 5:
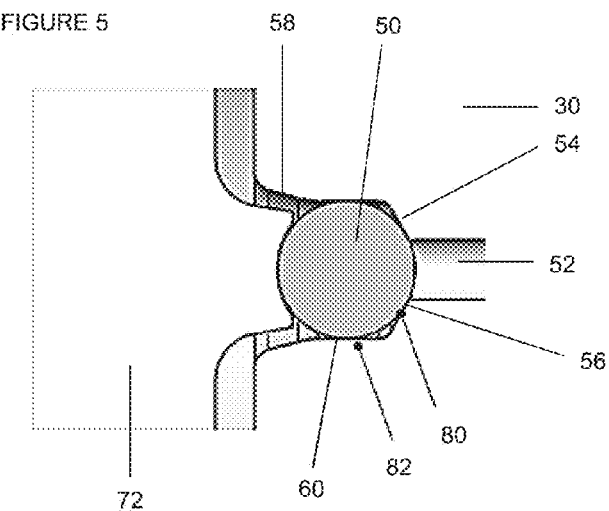
FIG. 5 is an enlarged view of a portion of the valve arrangement in FIG. 4, showing a first and second restriction during a first stage of valve opening movement.

In use, when the ball 50 is seated against the valve seating 56, fuel within the common rail is unable to flow through the first valve housing bore 48, past the ball 50, to the flow passage 42 to the low pressure drain. The valve seating 56 defines a seating area, which is slightly larger than the cross sectional area of the valve inlet 52. If the pressure of the fuel within the common rail exceeds the pre-determined threshold level, the force exerted on the ball 50 by the fuel is sufficient to overcome the biasing force from the spring 70. Therefore, the ball 50 lifts from the valve seating 56, which defines a gap therebetween, and initiates a first stage of valve opening movement, as shown in FIG. 5. The pre-determined threshold level at which the ball 50 lifts from the valve seating 56 is determined by the ratio of the biasing force to the seating area.

It is noted that the piston 72 does not entirely occlude the valve outlet ports 64, 66 when the ball 50 is in the closed position; therefore a flow path exists for fuel from the common rail to the low pressure drain as soon as the ball 50 lifts from the valve seating 56.

As shown in FIG. 5, during the first stage of valve opening movement the first flow restriction 80 is defined between the ball 50 and the first conical section 54 of the first valve housing bore 48. Due to the shape of the first conical section 54, the position of the first flow restriction 80 is away from the valve inlet 52, and substantially coincides with the position at which the ball 50 makes contact with the first conical section 54. Therefore, during the first stage of valve opening movement, the fuel pressure acts over a surface area of the ball 50 which is approximately the same as the valve seating area. Therefore, while the first restriction is governing the fuel flow, the pressure at which the ball 50 closes is very similar to the pre-determined threshold level at which the ball 50 originally lifts.

If the ball remains in the first stage of valve opening movement, as a result of a low fuel flow rate, the ball 50 acts in a similar way to a normal pressure limiting valve; the valve arrangement regulates the pressure at a level which is similar to the pre-determined threshold level, in the manner described earlier.

Figure 6:
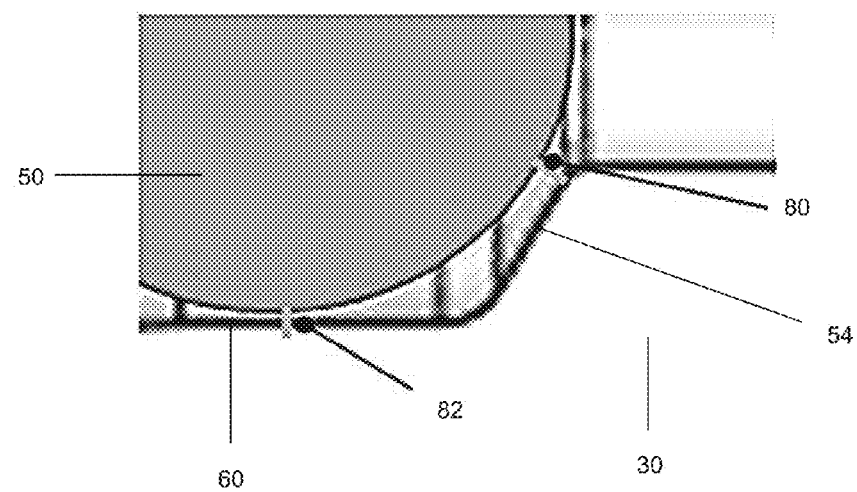
FIG. 6 is an enlarged view of the first and second restrictions in FIG. 5 during a second stage of valve opening movement.

If the flow rate past the ball 50 increases, the ball 50 continues to lift away from the valve seating 56, so that it will soon reach a position where the gap between the ball 50 and the valve seating 56 is larger than the gap between the ball 50 and the intermediate section 60 of the first valve housing bore 48. This commences the second stage of valve opening movement, as illustrated in FIG. 6.

Figure 7:
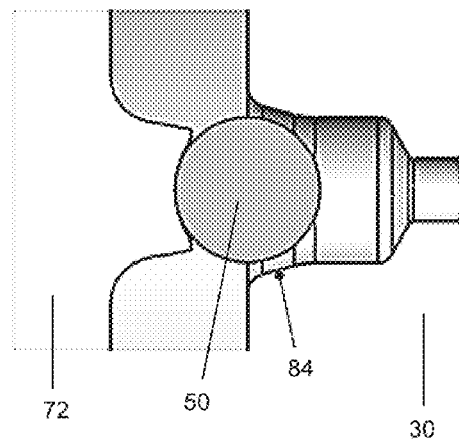
FIG. 7 is an enlarged view of a portion of the valve arrangement in FIG. 4, showing a third restriction during a third stage of valve opening movement.
Figure 8:
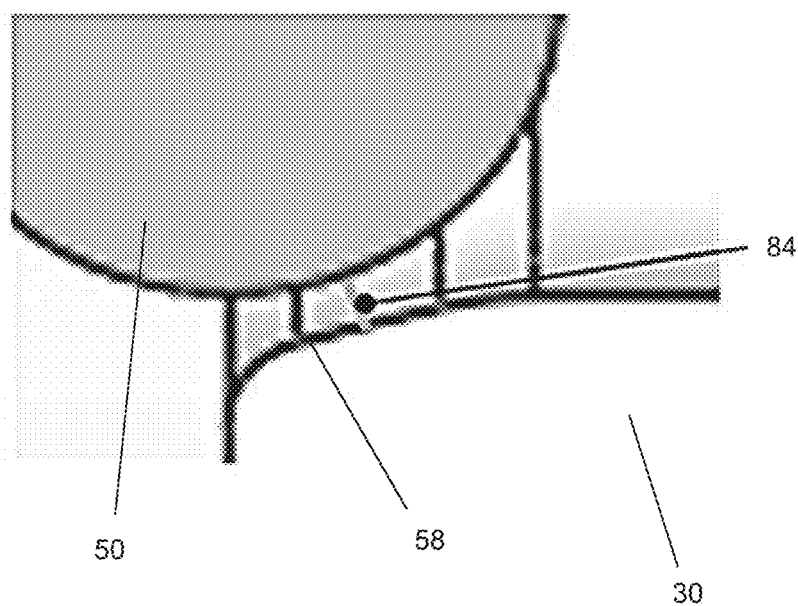
FIG. 8 is an enlarged view of the third restriction in FIG. 7.

At this point, the second flow restriction 82, defined by the gap between the ball 50 and the intermediate section 60 of the first valve housing bore 48, dominates over the first flow restriction 80. Therefore the pressure of the fuel which has entered the first valve housing bore 48 does not drop before reaching the second flow restriction 82. This means that almost half of the total surface area of the ball 50 is exposed to high pressure fuel. As this is a much larger area than the seating area, the force exerted on the ball 50 by the pressure of the fuel is much larger than the biasing force from the spring 70. This effect is enhanced by the tapering of the intermediate section 60; as the ball 50 moves further away from the valve seating 56, the gap between the ball 50 and the intermediate section 60 decreases in size, therefore the second flow restriction 82 becomes increasingly restrictive, meaning that more pressure is exerted on the ball 50. Therefore, as soon as the second flow restriction 82 is activated, the ball 50 and piston 72 move quickly away from the valve seating 56, until the ball 50 reaches the point where the intermediate section 60 of the first valve housing bore 48 opens out into the second conical section 58. This commences the third stage of valve opening movement, in which the third flow restriction 84 is defined between the ball 50 and the second conical section 58, as shown in FIGS. 7 and 8.

Once the ball 50 has reached the second stage of valve opening movement, a closing pressure is defined by the ratio of the biasing force to the exposed surface area of the ball 50 during the second stage of valve movement, which can be approximated as the cross sectional area of the intermediate section 60 of the first valve housing bore 48. The spring 70 will not be able to push the ball 50 back past the second flow restriction 82 until the fuel pressure drops to the closing pressure.

The valve arrangement 28 is not overly sensitive to the length of the intermediate section 60 of the first valve housing bore 48, as the ball 50 will simply continue to be pushed away from the valve seating 56 until the intermediate section 60 opens out into the second conical section 58 of the first valve housing bore 48. While the reaction force exerted by the spring 70 increases as the piston 72 compresses it further, during the second stage of valve opening movement the force exerted on the piston 72 by the pressure of the fuel in the common rail is considerably larger, and so the increase in reaction force from the spring 70 makes little difference. This feature of the invention allows for the intermediate section 60 to take a range of lengths, such that the length is optimised for the intended application of the valve arrangement 28. Furthermore, the flexibility of the length of the intermediate section 60 reduces the dependence on manufacturing tolerances, which means that the valve arrangement 28 is relatively simple and inexpensive to manufacture.

Due to the shape of the second conical section 58, the gap between the ball 50 and the second conical section 58 varies in size depending on the position of the ball 50; as the ball 50 moves further away from the valve seating 56, the size of the gap increases. Therefore the third flow restriction 84 provides a variable level of restriction. In this way the fuel pressure during the third stage of valve opening movement is regulated; if the pressure increases, the ball 50 will be pushed further away from the valve seating 56 which increases the size of the gap between the ball 50 and the second conical section 58, and therefore allows fuel to be drained at a higher flow rate which reduces the fuel pressure. If the fuel pressure decreases, the size of the gap between the ball 50 and the second conical section 58 also decreases thereby lowering the flow rate giving rise to an increase in pressure.

The second conical section 58 is shaped so as to create an optimum range of restriction to fuel flow dependant on the position of the ball 50.

The process of regulation continues in this fashion until the fuel pressure drops to the closing pressure at which the biasing force from the spring 70 is able to push the piston 72 and ball 50 back to the closed position in which the ball 50 is seated on the valve seating 56.

When the ball 50 initially lifts from the valve seating 56, it is held in place within the concave surface of the extension 76 of the piston 72 by the pressure of the fuel. The concave surface serves to direct the ball 50 towards the centre of the extension 76, such that the ball 50 is in the correct position when it closes. When the ball 50 and piston 72 reach the third stage of valve opening movement, the level of restriction provided by the third flow restriction 84 decreases as the ball 50 moves away from the valve seating 56. Therefore, the pressure exerted on the ball 50 by the fuel to hold it in place decreases as the ball 50 moves away from the valve seating 56. For this reason the mechanical stop 78 is provided; to ensure that the ball 50 does not move so far away from the valve seating 56 that it could move out of position by falling away from the extension 76 of the piston 72.

In addition to this, if the ball 50 were allowed to continue to move away from the valve seating 56, perhaps due to overshoot following the second stage of valve opening movement, eventually the third restriction would become so wide that the level of restriction it created to fuel flow would be negligible. In this scenario, the pressure of the fuel does not drop as it passes the ball 50, and therefore an entire surface of the piston 72 may be exposed to high pressure if fuel is not drained through the flow passage 42 to the low pressure drain quickly enough. As the piston 72 has a diameter which is substantially larger than the diameter of the ball 50, a much lower pressure is required to act on the surface of the piston 72 to resist the biasing force.

Therefore the closing pressure would be significantly reduced, and may be unacceptably low. The position of the mechanical stop 78 may be adjusted to take this into account.

In another embodiment of the invention, the piston 72 and the ball 50 may be formed together as a single integrated component.

It will be appreciated by a person skilled in the art that the invention could be modified to take many alternative forms to that described herein, without departing from the scope of the appended claims.

The invention claimed is:

1. A valve arrangement for use in limiting the pressure of fuel within an accumulator volume of an accumulator fuel system to a predetermined threshold level, the valve arrangement comprising:
    a valve outlet for communication with a low pressure drain;
    a valve housing provided with a valve housing bore for receiving fuel from the accumulator volume;
    a valve member comprising a ball slidably received in a first section of the housing bore, said member having a closed position in which it is engaged with a valve seating defined by the valve housing bore to prevent fuel flow from the accumulator volume to the valve outlet;
    biasing means for urging the valve member towards the valve seating;
    a first restricted flow means for restricting the flow of fuel between the accumulator volume and the valve outlet during a first stage of valve opening movement as soon as the valve member is lifted from the valve seating;
    a second restricted flow means effective during a second stage of valve opening movement which follows the first stage to provide a greater restriction than during the first stage; and
    a third restricted flow means effective during a third stage of valve opening movement which follows the second stage to provide a variable restriction to fuel flow dependent on the extent of opening movement of the valve member;
    wherein each of the first, second and third restricted flow means is defined between the ball and the first section of the valve housing bore;
    wherein the valve seating is located on a first conical section which is defined by the valve housing bore;
    wherein the first restricted flow means is defined between the valve member and the valve seating;
    wherein the third restricted flow means is defined by a second conical section, which is defined by the valve housing bore;
    wherein the first and second conical sections define an intermediate section therebetween, wherein the intermediate section cooperates with the valve member to define the second restricted flow means; and
    wherein the intermediate section is arranged to have a taper, such that the level of restriction is increased as the valve member moves away from the first conical section towards the second conical section.

2. A valve arrangement for use in limiting the pressure of fuel within an accumulator volume of an accumulator fuel system to a predetermined threshold level, the valve arrangement comprising:
    a valve outlet for communication with a low pressure drain;
    a valve housing provided with a valve housing bore for receiving fuel from the accumulator volume;

a valve member comprising a ball slidably received in a first section of the housing bore, said member having a closed position in which it is engaged with a valve seating defined by the valve housing bore to prevent fuel flow from the accumulator volume to the valve outlet;

biasing means for urging the valve member towards the valve seating;

a first restricted flow means for restricting the flow of fuel between the accumulator volume and the valve outlet during a first stage of valve opening movement as soon as the valve member is lifted from the valve seating;

a second restricted flow means effective during a second stage of valve opening movement which follows the first stage to provide a greater restriction than during the first stage;

a third restricted flow means effective during a third stage of valve opening movement which follows the second stage to provide a variable restriction to fuel flow dependent on the extent of opening movement of the valve member; and a piston member which is situated between the biasing means and the valve member;

wherein each of the first, second and third restricted flow means is defined between the ball and the first section of the valve housing bore.

3. A valve arrangement according to claim 2, wherein the valve member and the piston member is formed together as an integrated component.

4. A valve arrangement according to claim 2, further comprising means to limit the range of movement of the piston member.

5. A valve arrangement according to claim 2, wherein the piston member is provided with an extension which cooperates with the valve member to aid positioning and/or retention of the valve member.

6. A valve arrangement according to claim 5, wherein an end face of the extension is concave to aid positioning and/or retention of the valve member.

\* \* \* \* \*